Aug. 26, 1930.  C. A. HUFF  1,774,328
CLIPPING DEVICE
Filed Jan. 18, 1929    2 Sheets-Sheet 1

Charles A. Huff
INVENTOR.

Witnesses:-
Anna M. Ward
Evelyn Crompton

BY
Joshua R. H. Potts
ATTORNEY.

Aug. 26, 1930.  C. A. HUFF  1,774,328
CLIPPING DEVICE
Filed Jan. 18, 1929   2 Sheets-Sheet 2
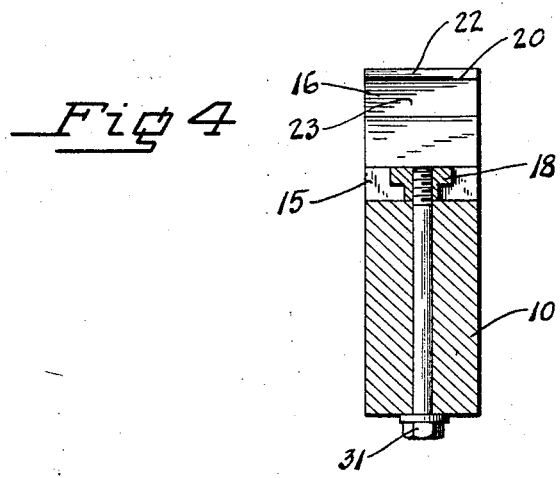
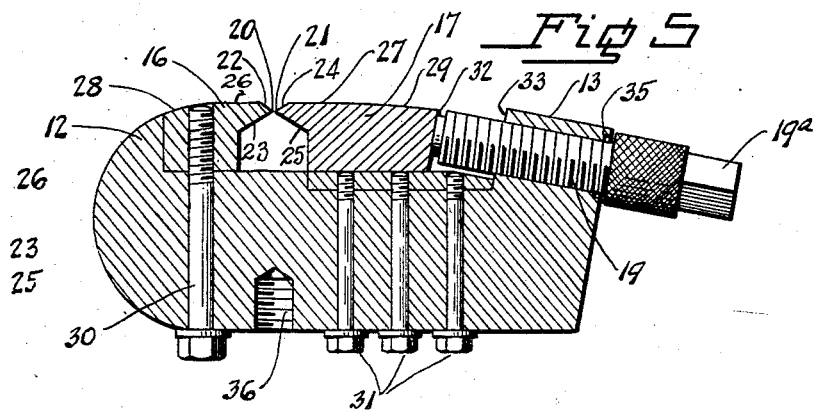
Charles A. Huff
INVENTOR.
BY
ATTORNEY.

Patented Aug. 26, 1930

1,774,328

UNITED STATES PATENT OFFICE

CHARLES A. HUFF, OF PHILADELPHIA, PENNSYLVANIA

CLIPPING DEVICE

Application filed January 18, 1929. Serial No. 333,351.

This invention relates to tools for shearing or clipping metal projections, such as the ends or heads of bolts.

An object of the invention is to improve tools of this character.

Further objects are to provide a tool of such construction that the parts thereof will not be broken or mutilated under stresses to which it is subjected and which will be adapted to be projected into difficultly accessible places and effectively perform its functions under these circumstances.

A further object is to provide a tool of the above character with a nicety of construction such that the parts thereof will cooperate to perform the functions for which they are designed with the least possible inconvenience and labor on the part of an operator.

A still further object is to so construct the tool that it will present the greatest possible number of elements of strength.

The above objects are accomplished by providing a base or body portion having projecting abutments on which are mounted cutting jaws which are employed in shearing or breaking the metal projections; one of these jaws is slidably mounted on the body portion, while the other may be stationary.
These jaws have cutting edges directed toward each other formed by surfaces converging toward each other; and the cutting edges of the two jaws may be arranged so as to be presented at all times in a plane parallel to the line of movement of the movable jaw. Associated with the movable jaw is a pressure exerting means for moving the movable jaw toward the stationary jaw.

The tool may be constructed to prevent mutilation of the jaws one by the other by providing a stop in the form of a shoulder and this stop may be in the nature of a drop in the recess between the abutments on the surface of which the track for the movable jaw is mounted.

The strength of the tool may be increased by securing the stationary jaw and the track on which the movable jaw rides to the body by means passing completely through the body transversely of the connected parts and in parallelism with the sides of the tool. Its adaptability in difficultly accessible situations may be enhanced by forming flat surfaces adjacent the cutting or shearing edges and by arranging the means for moving the movable jaw at an angle to the line of movement of the jaw.

In the drawings,

Figure 4 is a section taken transversely of the tool on the line 4—4 of Figure 1, illustrating the sliding connection between the body of the tool and the movable jaw, and Figure 5 is a section longitudinally of the jaws and in parallelism with the sides thereof, this section being taken on the line 5—5 of Figure 2 of the drawings.

Figure 1:
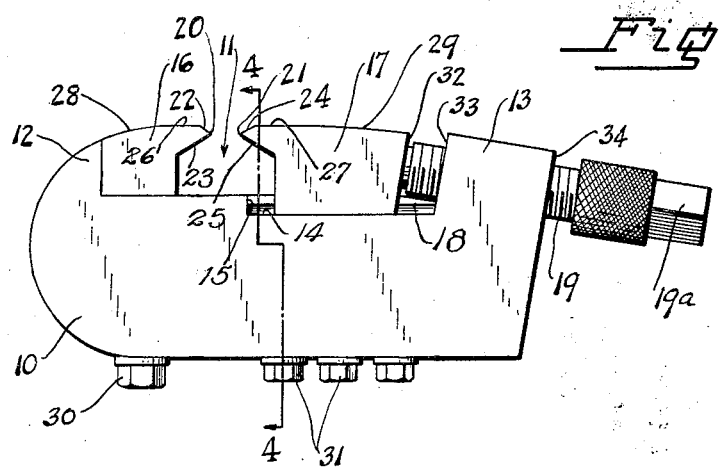
Figure 1 is a side elevation of an embodiment of the tool made in accordance with the principles of the invention.
Figure 2:
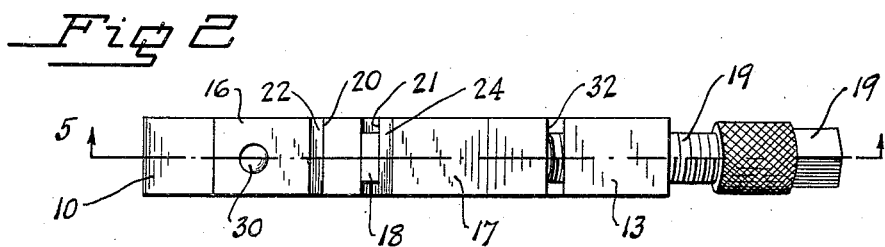
Figure 2 is a plan view of the same.
Figure 3:
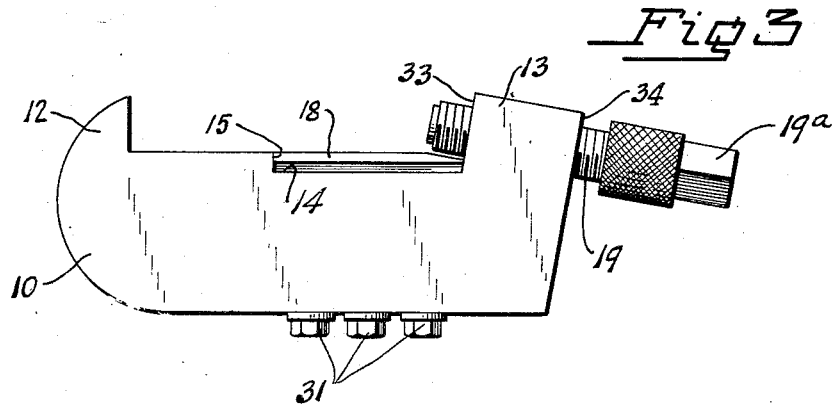
Figure 3 is a view similar to Figure 1 with the cutting jaws removed.

Referring now to the various figures of the drawings in detail by reference numerals, 10 designates the body or base of the tool which is formed on one edge with a recess 11 providing end abutments 12 and 13. The recess may be formed with a drop, as indicated at 14, which provides an abutment shoulder 15 serving as a limit for the movement of the movable jaw toward the fixed jaw. The fixed and movable jaws are respectively designated in the drawings by the reference characters 16 and 17, the latter being mounted to slide on a track 18 fixed to the body within the drop 14. A screw 19 is threaded through the abutment 13 and serves to advance the jaw 17 toward the jaw 16.

The strength and adaptability of the tool is dependent largely on the peculiarities and construction of the various parts, as hereinbefore outlined, and upon the manner of assembling the said parts.

It will be noted by reference to Figures 1 and 5 that the cutting jaws are provided with opposing cutting edges 20 and 21 formed by the convergences of upper and lower planes 22 and 23 on the fixed jaw, and 24 and 25 on the movable jaw. These planes are inclined to the plane defined by the cutting edges when the jaws are in an open position, as shown in Figure 1, so that the inclinations above and the inclinations below this plane form substantially equal angles therewith. An effective angle between these inclinations and the above mentioned plane is approximately 30°. Angles of about these dimensions afford sufficient strength on the cutting portions while affording sufficient edge to be effective in severing the projecting bolt head or other member to be severed.

In order that the tool may fit against a flat surface and rest firmly thereagainst while the projecting member is being severed, the jaws are flattened for a slight distance adjacent the inclined surfaces 22 and 24, as indicated by the numerals 26 and 27, the jaws tapering from these flattened portions forwardly and rearwardly in such a manner as to merge with the curvature of the abutments 12 and 13, respectively. These curvatures are designated by the reference characters 28 and 29 and, together with the flattened portions of the jaws, facilitate the proper attachment of the cutting tool to the member to be severed thereby.

The strength of the connection between the body portion 10 and the jaws is increased over previous constructions by the mounting of the jaws within a recess and by the peculiar connection thereof with the body portion. The fixed jaw is secured to the body portion by means of a screw bolt 30 extending through the body portion and the fixed jaw in parallelism with the side surfaces thereof. This affords not only great strength in the connection but also relieves the space between the jaws of obstructing bolt heads or the like, and leaves the entire space free to accommodate the projecting member to be served from a surface or the like.

The movable jaw, as stated before, is secured to the body by means of a track 18, the latter being mounted within the drop 14 and secured to the body by means of a plurality of bolts 31 extending through the body portion in parallelism with the side surfaces thereof. The track is in the nature of a T-member, as clearly illustrated in Figure 4 of the drawings, having a slidable fit with a similarly shaped groove in the jaw 17. This particular connection between the slideable jaw and the body portion affords great strength and ruggedness which will not yield to any reasonable force exerted thereon, as a torque, or sidewise twisting or turning of the jaw 17.

The rear surface 32 of the jaw 17, it will be noted by reference to Figures 1 and 5, is inclined to the line of travel of said jaw, the abutment 13 has its faces 33 and 34 similarly inclined and the adjusting screw 19 for moving the jaw 17 toward the fixed jaw 16 is threaded through the abutment 13 at an angle such that its forward end will abut against the surface 32 in parallelism therewith. This arrangement affords an inclination so that operating space may be afforded in the vicinity of the squared end 19$^a$ of the adjusting screw.

The tool may be provided with a socket 36 in the surface thereof opposite the recess in which the cutting jaws are mounted to accommodate an ell handle or other instrumentality where it is desirable to use the same in connection with the tool for advancing the screw 19. As it is not feasible to cut threads close up to a shoulder, as the threads on the screw 19 to the knurled part so in order that there may be no jamming of the threadless part in the advancement of the screw 19, the abutment 13 is provided with a countersinking 35 in the rear surface of the abutment, as clearly shown in Figure 5 of the drawings. This construction does away with the necessity of washers in this connection.

In operation, the jaws are separated a sufficient distance to receive the projection to be severed, which may be in the nature of a bolt head, held therebetween. The flat portions of the movable and fixed jaws are then pressed firmly against the surface from which the bolt head pojects and the movable jaw advanced by means of the screw 19 until the head is grasped between the two jaws. Further advancement will cause a simultaneous shearing and breaking of the metal as the head of the bolt rides up on the inclinations 23 and 25. The construction of the jaws render mutilations thereof in their operations extremely rare and mutilation of one jaw by the other is prevented by the shoulder formed by the drop 14, limiting the jaw 17 in its movement toward the jaw 16 so that the cutting edges of the two jaws may be brought into contact but will not be permitted to overlap or cause any strain one upon the other.

By the arrangement of the parts as before set forth, a stockiness and sturdiness of construction is made possible and a tool of great mobility and strength is provided.

It will be understood that various modifications may be made in the construction of this device without departing from the spirit of the invention herein set forth and hereafter claimed.

I claim:—

1. A tool for severing projections, including a body and a pair of jaws secured thereto, said jaws having cutting edges adjacent each other, the upper surfaces of the jaws being flattened adjacent said edges, and tapered away from the flattened portions toward the base on the sides of the flattened portions opposite the cutting edges, means threaded through the body and disposed at an angle to the plane through said edges for actuating the jaws.

2. A tool for severing projections, including a body recessed between the ends thereof on one edge to form abutments, cutting jaws arranged within the recess, one of which is stationary, the other movable along a path, the bottom of said recess being further recessed to form a limit to the movement of the movable jaw toward the stationary jaw.

3. A tool for severing projections, including a body recessed between the ends thereof on one edge to form abutments, cutting jaws arranged within the recess, one of which is stationary, the other movable along a path, the bottom of said recess being further recessed, and a track on which the movable jaw moves, resting in said further recessed portion.

4. A tool for severing projections, including a body recessed on one edge so as to provide abutments at the ends of the tool, a jaw secured adjacent one abutment, a movable jaw adapted to be moved to position against the other abutment, said movable jaw and last named abutment having their adjacent surfaces inclined to the line of movement of the movable jaw, and a member for moving the movable jaw threaded through the said last named abutment at an angle to the line of movement of the movable jaw to abut the inclined surface of the jaw in parallelism thereto.

5. A tool for severing projections, including a body having a stationary jaw thereon and an abutment spaced therefrom, a jaw movably mounted on the body between the abutment and stationary jaw, said jaw having the surface thereof toward the abutment inclined to the line of movement of the jaw, a member movably projecting through said abutment at an angle to the line of movement of the movable jaw to abut said inclined surface in parallelism therewith.

6. A tool for severing projections, including a body portion, a stationary and a movable jaw on the body portion, said jaws having cutting edges extending toward each other and lying in a plane parallel to the line of movement of the movable jaw, the surfaces of said jaws being inclined above and below said plane at substantially equal angles, said jaws having flat portions adjacent the inclinations and rearward inclinations from said flat portions as well as the forward inclinations above the cutting edge above referred to and means disposed in the body at an angle to the plane through the cutting edges for actuating the movable jaw.

7. A tool for severing projections, including a curved body portion, a stationary and a movable jaw on the body portion, said jaws having cutting edges extending toward each other and lying in a plane parallel to the line of movement of the movable jaw, the surfaces of said jaws being inclined above and below said plane at substantially equal angles, said jaws having flat portions adjacent the inclinations, and curved portions extending from the flat portions on the jaws merging with the curvature of the body portion.

8. A tool for severing projections, including a body portion, a fixed and a movable jaw, an abutment on the body portion for the movable jaw and a screw threaded through the abutment at an angle to the line of movement of the movable jaw and contacting with the movable jaw, said abutment being countersunk about said screw on the opposite side to said movable jaw.

9. A tool for severing projections comprising a body portion having a recess in one edge providing abutments at the ends of the body portion and a drop in said recess, a track in said drop, a movable jaw on said track, a stationary jaw in the recess spaced from said drop, said jaws having cutting edges lying in a plane parallel to the line of movement of the movable jaw, said jaws having equally inclined surfaces above and below said plane and flat portions adjacent the upwardly inclined surfaces, said abutments having sloping surfaces adjacent the recess and said jaws having surfaces curved to merge with the sloping surfaces of the abutments, the abutment adjacent the movable jaw having an inclination to the body portion and the rear surface of the movable jaw having a correspondingly inclined surface, a screw threaded through the inclined abutment and abutting the inclined surface of the movable jaw in parallelism thereto.

In testimony whereof I have signed my name to this specification in the presence of two subscribing witnesses.

CHARLES A. HUFF.